Patented May 20, 1947

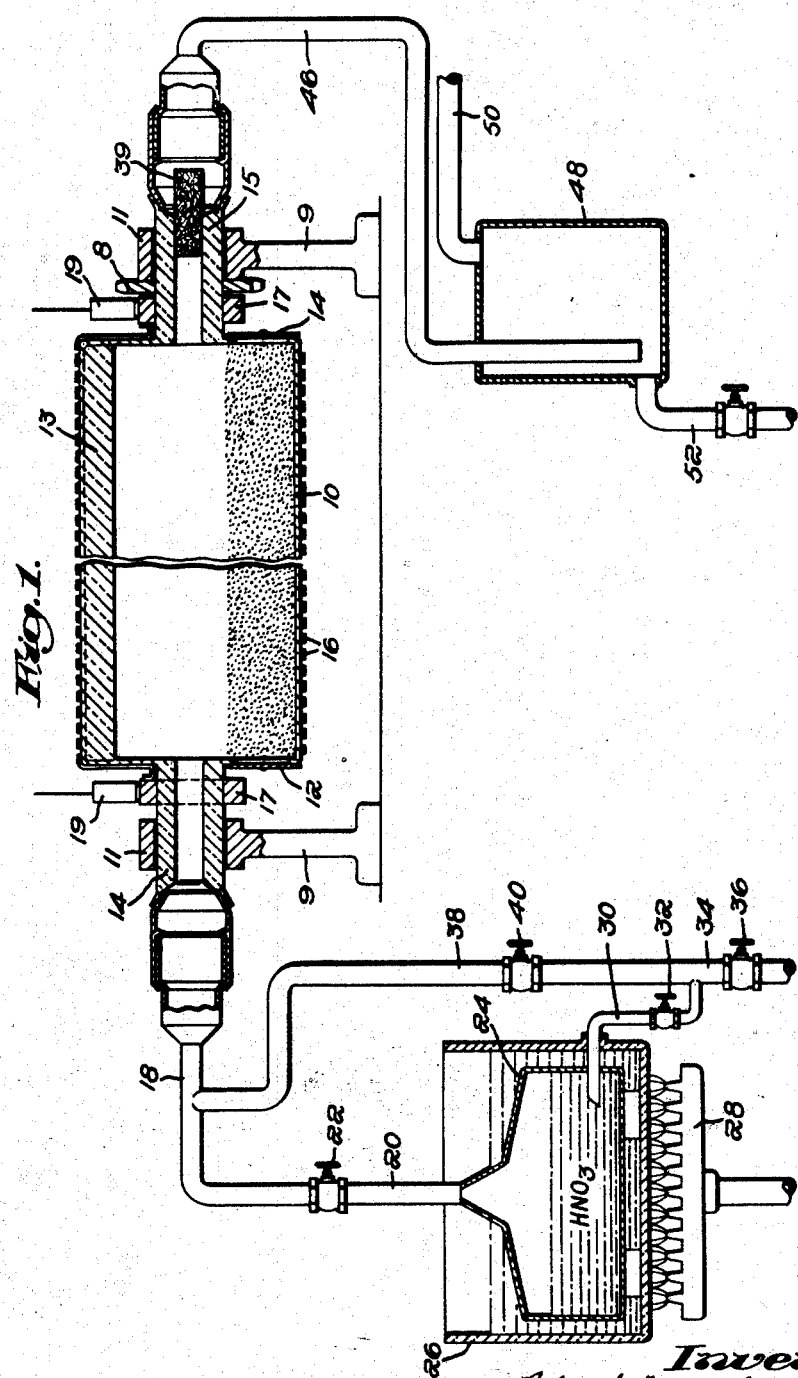

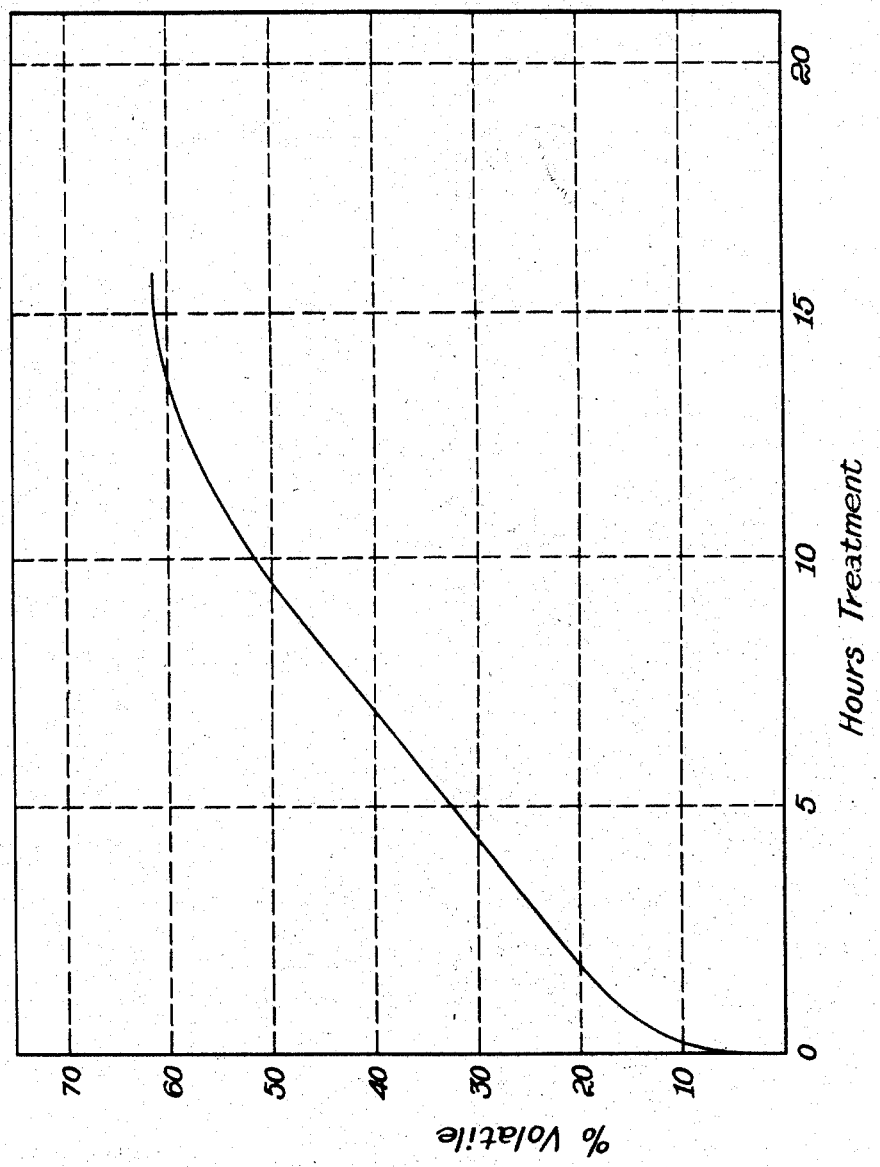

2,420,810

UNITED STATES PATENT OFFICE 2,420,810

PROCESS FOR THE MANUFACTURE OF HIGH VOLATILE CARBON BLACK

Richard I. Bray, Gloucester, Jacob Gabry, Saugus, and Charles B. Wendell, Jr., Needham, Mass., assignors to Godfrey L. Cabot, Inc., Boston, Mass., a corporation of Massachusetts Application December 18, 1941, Serial No. 423,512

10 Claims. (Cl. 23—209.1)

This invention relates to improvements in processes of treating carbon black whereby certain selected characteristics may be imparted to it in accordance with the use for which it is intended. The invention includes within its scope a new and improved carbon black of substantial volatile content, in some forms a higher volatile content that has ever before been known, and also the novel process for producing such carbon black.

The United States Bureau of Mines, Bulletin No. 192, is authority for the statement that the volatile content of commercial carbon black runs from 5.33% to 14.44%, although in practice a somewhat wider range is encountered.

An analysis of the volatile content of a typical commercial carbon black sample having a volatile content of 4.49% is published in "Industrial and Engineering Chemistry" for September 1928 in an article entitled "Carbon Black—A Study of its Volatile Constituents" as follows:

| | Percent weight |
|---|---|
| Carbon dioxide | 1.178 |
| Illuminants | 0.030 |
| Oxygen | 0.071 |
| Carbon monoxide | 2.805 |
| Hydrogen | 0.084 |
| Ethane | 0.002 |
| Methane | 0.048 |
| Nitrogen | 0.275 |
| | 4.493 |

In the present specification and claims the term "volatile content" is used, as it is commonly in the carbon black industry, to mean the percentage of the constituents above listed which the carbon black contains.

Heretofore carbon black having a volatile content as high as 20% has been produced by heating to moderate temperatures while admitting a controlled amount of air thereto, as suggested in Reissue Letters Patent No. 19,664, Damon. In carrying out that process, however, there generally occurs a serious loss of carbon black by combustion, that is to say, a substantial proportion of the treated material is destroyed in increasing the volatile content of the remainder.

It is commercial practice to calculate the surface area of carbon black by measuring its adsorption of liquid nitrogen at minus 196° C. The surface area of certain standard grades of carbon black has been determined as approximately 110 sq. meters per gram of carbon black. When such carbon blacks are heated, as in the process of the Damon patent above identified, their surface area is greatly increased, to as much as 1000 sq. meters per gram for example. With this increase in surface area occurs a concomitant and objectionable falling off in flow and an objectionable tendency toward thixotropy when the treated carbon black is mixed with liquid.

Our invention is based on the discovery that the volatile content of carbon black may be increased by treatment with nitric acid or certain other nitric oxidizing agents, without substantial combustion loss and without other incidental changes in physical properties which have heretofore characterized carbon black having substantial volatile content. An important object of our invention is to produce carbon black having a substantial volatile content, i. e. more than 12%, and at the same time low or moderate surface area, for example, not over about 400 square meters per gram, little or no tendency to thixotropy and long flow characteristics. It has not been possible to obtain such carbon black by any processes heretofore known and used. By "long flow" characteristics we mean the characteristics so designated in the Bureau of Mines Bulletin No. 192, which terminology is consistent with accepted usage of the carbon black industry.

A further object of our invention is to provide a practicable and inexpensive process by which the volatile content of carbon black may be increased to as much as 30–60% as compared with 18–20% heretofore considered the maximum practical.

Carbon black treated according to our invention tends to become increasingly hydrophilic, whereas all ordinary carbon black is organophilic. The hydrophilic tendency of the black treated according to our invention reaches the maximum in those blacks of about 50% volatile content and over, and these form stable suspensions in aqueous media without the necessity of using a dispersing agent.

Although we have not as yet explored all the possible uses of carbon black produced by the process of the invention, such experiments as have been performed indicate that it is useful in explosive compounds and that superior inks may be obtained by its use, since thixotropy is lessened, the body is improved, and in long inks an astonishing increase in flow is noted. Moreover, these desirable results are secured in accordance with our improved process without loss of color intensity. Heretofore, it has been necessary to sacrifice color to improve flow, but the product of our invention has both intense color and long flow.

Although an improved product can be obtained by adding liquid nitric acid to carbon black and then washing the mass to remove excess acid, such a procedure is accompanied by the formation of indispersible agglomerates, and the product is therefore not suitable for uses where dispersion is required. However, superlative results may be obtained by passing a heated mixture of nitric acid vapor and air through a dry, heated mass of carbon black, and later flushing the mass with hot air to remove excess fumes of the acid.

In carrying out the process of our invention any suitable or conventional apparatus may be employed. One satisfactory type is illustrated in the accompanying drawings in which, Fig. 1 is a diagrammatic view of the apparatus in side elevation, and Fig. 2 is a curve showing the increase of volatile content of the carbon black during treatment.

The apparatus includes a heavy glass cylinder 10 which has hollow shafts 14 and 15 at either end. The shafts turn in bearings provided by a pair of standards 9, which support the cylinder in horizontal position. In the end walls of the cylindrical container 10 is a pair of opposed doors or plates 12 by means of which carbon black can be loaded into the container and removed from it. A strip of "Nichrome" resistance wire is wound around the surface of the container 10 and secured at its ends to metal rings 17 which are rigidly secured to the hollow shafts 14 and 15. A brush 19 is mounted to bear upon each of the rings 17, and current from a suitable source is applied to the brushes so that the container 10 and its contents can be heated. Preferably, and as herein shown, the rotary container 10 is provided with one or more internal fins or vanes 13 by which the carbon black to be treated is lifted and spilled back and forth as the container is rotated, thus insuring complete contact of the carbon black particles with the vapor passing through the container. The container 10 may be rotated by any convenient means and we have indicated at 8 a sprocket fast on the shaft 15 which may be driven by a chain coupled to a slow speed motor or speed reducing mechanism.

At the left end of the container 10 is an inlet pipe 18 connected to the hollow shaft 14 by a swivel joint and to a pipe 20 controlled by a valve 22 and leading to the top of a flask 24 set in an open tank 26 which is partially filled with water. Nitric acid, 70% concentration, is contained in the flask 24. The tank 26 is adapted to be heated by a burner 28 located beneath it. A pipe 30 controlled by a valve 32 leads through the wall of the tank 26 and into the flask 24. The pipe 30 is connected to a vertical pipe 34 leading from a supply of compressed air and controlled by a valve 36. The pipe 34 is extended through the section 38, controlled by a valve 40, to make connection with the inlet pipe 18 at a point just outside its swivel connection with the rotary container.

At the other end of the container 10 is an outlet pipe 46 which is connected to the shaft 15 by a swivel joint and runs into a condenser 48. A plug 39 of glass wool is inserted in the outlet shaft 15 to prevent carbon black from escaping from the container 10. A suction line 50 is connected to the top of the condenser, and a valve controlled outlet 52 leads from the bottom of the condenser. The condenser 48 may be cooled, if desired, by any suitable means (not shown).

In practicing the process of our invention we heat the tank 26 until the water boils and simultaneously heat the container 10 to approximately 300° F. The valves 40 and 52 are closed, and the valves 22, 32, and 36 are opened. Air from the pipe 30 bubbles through the nitric acid which gives off copious fumes. The heated mixture of air and acid fumes are passed through the container 10. The mixture may, if desired, be drawn through the container by means of suction through the pipe 50. At first the reaction of the carbon black in the heated container 10 and the acid fumes evolves heat, so that it is desirable to switch off the supply of current to the resistance wire 16, temporarily.

As shown in Fig. 2, the increase in volatile content is at first very rapid, then the rate of increase slows down, and the addition of volatile content increases steadily but slowly for about twelve hours. Large quantities of $NO_2$ are evolved until the reaction stops, when the volatile content exceeds 60%. Thereafter the production of $NO_2$ practically stops and nitric acid distills in the condenser. By connecting the pipe 50 to washing towers it is possible to recover $NO_2$ and $NO$.

It will be evident that the apparatus described permits controls of different kinds over the process; the temperatures of the carbon black being treated and of the acid, the rate of flow of air into the flask 24, and the concentration of the acid, may all be varied to affect the result.

The carbon black should, of course, be maintained at a temperature higher than the boiling point of the nitric acid to prevent wetting and consequent agglomeration of the carbon black. We have found that the optimum results are obtained when the carbon black is maintained at 300° F. Experiments carried out at more elevated temperatures seem to show that the surface area is undesirably increased and the yield is relatively poor. Incidentally, nitrogen may be substituted for air as the diluent for the acid fumes without affecting the result.

When the reaction has been accomplished, the valves 22 and 32 are closed and the valve 40 is opened. The carbon black in the container is flushed with air until the acid fumes have been entirely driven off. The temperature of the carbon black in the container may advantageously be raised to 400° F. near the end of the flushing period.

The treated black may be removed by swinging down the plates 12 and 14 and pushing the black from the container 10. The treated carbon black will be found to have a volatile content according to the conditions of temperature, acid concentration, and rate of air supply at which the apparatus was operated. With air saturated at 212° F. with 70% commercial nitric acid, and with the carbon black at 300° F., and employing such a flow of air that the contact time of the gaseous mixture in the container is about 50 seconds, the surface area of the carbon black will not have increased substantially, the volatile content may reach 60%, and the losses of carbon black during treatment are not sufficient to render the process uneconomical.

It appears that the carbon black product of our process is unique in that certain of the valuable properties are enhanced to a considerable degree over those commonly encountered in carbon blacks treated with air at elevated temperatures. We cannot describe the nature of the volatile content thus formed on the surface of the black except to suggest that it consists in part of complex, little known oxides of carbon. However, the difference is well brought out by the fact that carbon black produced by our process and having over 13% volatile content is hydrophilic. When untreated carbon black, or carbon black treated by other processes to increase its volatile content, is shaken with water and then with benzene, the carbon black will transfer at once to the benzene. Now we have discovered that when carbon black treated by our process to increase the volatile content to roughly 13% is shaken first with water and then with benzene, the carbon black will not transfer to the benzene but remains in the water. Accordingly, one distinguishing characteristic of our novel product is its hydrophilic nature.

An analysis of volatile constituents driven off a sample of "Mogul" carbon black having a volatile content of 60% and produced in accordance with the invention herein disclosed, shows that the gaseous constituents were distributed as follows:

| | Percent |
|---|---|
| $CO_2$ | 32.5 |
| $CO$ | 60.9 |
| $H$ | 3.0 |
| $N$ | 3.6 |

Another unique result of the practice of our invention is the fact that carbon black treated by our process to a volatile content of over 50% immediately disperses in water to form a stable colloidal suspension. The dispersion is automatic and requires no shaking, or other treatment to start it. A dispersion of ordinary carbon black can be formed only by grinding or by using a dispersing agent, and the result is not stable but passes from the water into benzene very readily. In view of these facts it is evident that we have invented a high volatile carbon black of different nature from that known before, but can only describe it by the terms of its manufacture.

It will be evident to those skilled in the art that the hot nitric acid vapors are subject to a degree of decomposition and that the oxides of nitrogen so formed, in addition to the acid vapors, are active in combining with the carbon black to increase its volatile content. Experiments have shown that by substituting heated oxides of nitrogen for the nitric acid a carbon black having a high volatile content may be secured, although it is not now convenient to secure $NO_2$ in commercial quantities. However, the scope of our invention definitely includes the use of gaseous oxides of nitrogen with or without suitable diluent gases, such as nitrogen, flue gases, etc.

Having thus described and illustrated the process of our invention and the novel and useful product thereof, what we claim as new and desire to secure by Letters Patent of the United States is:

1. A process for the production of carbon black having a volatile content in excess of 12%, a moderate surface area and long flow characteristics, which comprises the step of passing nitric acid vapor through a mass of carbon black in a dry state and removing free nitric acid vapor from the treated black.

2. A process for the production of carbon black having a volatile content in excess of 12%, a moderate surface area and long flow characteristics, which comprises the steps of passing a hot mixture of nitric acid vapor and air through a mass of carbon black heated at least to 200° F. and not over 400° F., and then removing free nitric acid vapor from the treated mass.

3. A process for the production of carbon black having a volatile content in excess of 12%, a moderate surface area and long flow characteristics, which includes the step of passing nitric acid through a mass of agitated carbon black at a temperature not exceeding 400° F.

4. A process for the production of carbon black having a volatile content in excess of 12%, a moderate surface area and long flow characteristics, which includes the step of passing heated dilute vapor of nitric acid through a mass of carbon black in a dry state at a temperature not exceeding 400° F. for a period of at least five hours.

5. A process for the production of carbon black having a volatile content in excess of 12%, a moderate surface area and long flow characteristics, which comprises passing a mixture of nitric acid vapor and a diluent heated to about 212° F. through a mass of carbon black in a dry state heated to about 300° F. and flushing the treated mass with air heated to about 400° F.

6. A process for the production of carbon black having a volatile content in excess of 12%, a moderate surface area and long flow characteristics, which includes the steps of passing nitric acid vapor through a mass of flocculent carbon black maintained at a temperature sufficiently high to prevent condensation of the acid vapor therein, the carbon black being initially heated by the resulting reaction and then tending to cool, and after this initial stage continuing the process with the addition of external heat to the carbon black under treatment.

7. A process for the production of carbon black having a volatile content in excess of 12%, a moderate surface area and long flow characteristics, which comprises placing impingement carbon black in a dry state in contact with hot vapors of nitric acid and oxides of nitrogen, and then flushing the treated carbon black to remove free vapors.

8. A process for the production of carbon black having a volatile content in excess of 12%, a moderate surface area and long flow characteristics, which comprises placing carbon black in a dry state in contact with gaseous oxides of nitrogen, and then flushing the carbon black which has been so treated to remove excess oxides of nitrogen.

9. A process for the production of carbon black having a volatile content in excess of 20% and a moderate surface area, which comprises passing nitric acid vapor through a mass of carbon black maintained in a dry state above the boiling point of nitric acid.

10. A process for the production of carbon black having a volatile content in excess of 20% and a moderate surface area, which comprises mixing hot nitric acid vapor with a gaseous diluent and passing the mixture through an agitated mass of heated carbon black in a dry state.

RICHARD I. BRAY.
JACOB GABRY.
CHARLES B. WENDELL, Jr.

REFERENCES CITED

The following references are of record in the file of this patent:

UNITED STATES PATENTS

| Number | Name | Date |
|---|---|---|
| 1,989,107 | Morrell | Jan. 29, 1935 |
| 1,497,543 | Chaney | June 10, 1924 |
| 1,632,845 | Oberle | June 21, 1927 |
| 2,005,022 | Damon | June 18, 1935 |
| 1,191,383 | Aylsworth | July 18, 1916 |
| 2,312,707 | Fuchs | Mar. 2, 1943 |

OTHER REFERENCES

"Carbon Black," reprint from Ind. and Eng. Chem., pages 4–6.

"Acetylene Carbon Black," article in Can. Chem. and Metallurgy, vol. 17, pages 93–95.